United States Patent [19]

Schuler

[11] Patent Number: 5,300,844
[45] Date of Patent: Apr. 5, 1994

[54] HIGH-VOLTAGE INSULATION FOR STATOR WINDINGS OF ELECTRIC MACHINES

[75] Inventor: Roland Schuler, Wettingen, Switzerland

[73] Assignee: Asea Brown Boveri Ltd., Baden, Switzerland

[21] Appl. No.: 52,991

[22] Filed: Apr. 27, 1993

[30] Foreign Application Priority Data

Jun. 10, 1992 [DE] Fed. Rep. of Germany ....... 4218927

[51] Int. Cl.$^5$ .............................................. H02K 3/34
[52] U.S. Cl. ...................................... 310/215; 310/45; 310/201
[58] Field of Search ............... 310/43, 45, 179, 196, 310/201, 213, 214, 215, 254

[56] References Cited

U.S. PATENT DOCUMENTS

| | | | |
|---|---|---|---|
| 4,403,163 | 9/1983 | Armerding et al. | 310/213 |
| 4,634,911 | 1/1987 | Studniarz et al. | 310/215 |
| 4,806,806 | 2/1989 | Hjortsberg et al. | 310/45 |
| 5,066,881 | 11/1991 | Elton et al. | 310/215 |
| 5,099,159 | 3/1992 | Liptak et al. | 310/45 |

FOREIGN PATENT DOCUMENTS

| | | | |
|---|---|---|---|
| 1166308 | 3/1964 | Fed. Rep. of Germany | 310/215 |
| 2215206 | 10/1972 | Fed. Rep. of Germany | 310/215 |
| 568071 | 3/1945 | United Kingdom | 310/215 |

OTHER PUBLICATIONS

Production of the Windings of Electric Machines, Springer Verlag, Vienna-New York, 1973, pp. 147-151.

*Primary Examiner*—Steven L. Stephan
*Assistant Examiner*—Matthew Nguyen
*Attorney, Agent, or Firm*—Oblon, Spivak, McClelland, Maier & Neustadt

[57] ABSTRACT

The conductor bars of stator windings of rotating electric machines are usually multiply wound around with two-layer mica strips as major insulation and then impregnated with synthetic resin. It is proposed to use as first layer (L1) a mica strip which is provided on both sides with a textile carrier (24, 25). The further layers (L2, L3, L4, ...) are then wound with a mica strip (27) provided with a textile carrier (28) only on one side. A major insulation constructed in this way is very homogeneous. The textile carrier (24), preferably consisting of glass fabric, which bears directly on the conductor surface, optimizes the impregnation and produces an effective bond between the insulation and conductor.

3 Claims, 1 Drawing Sheet

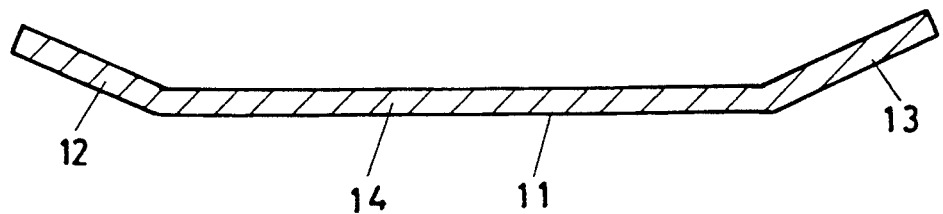
FIG.1
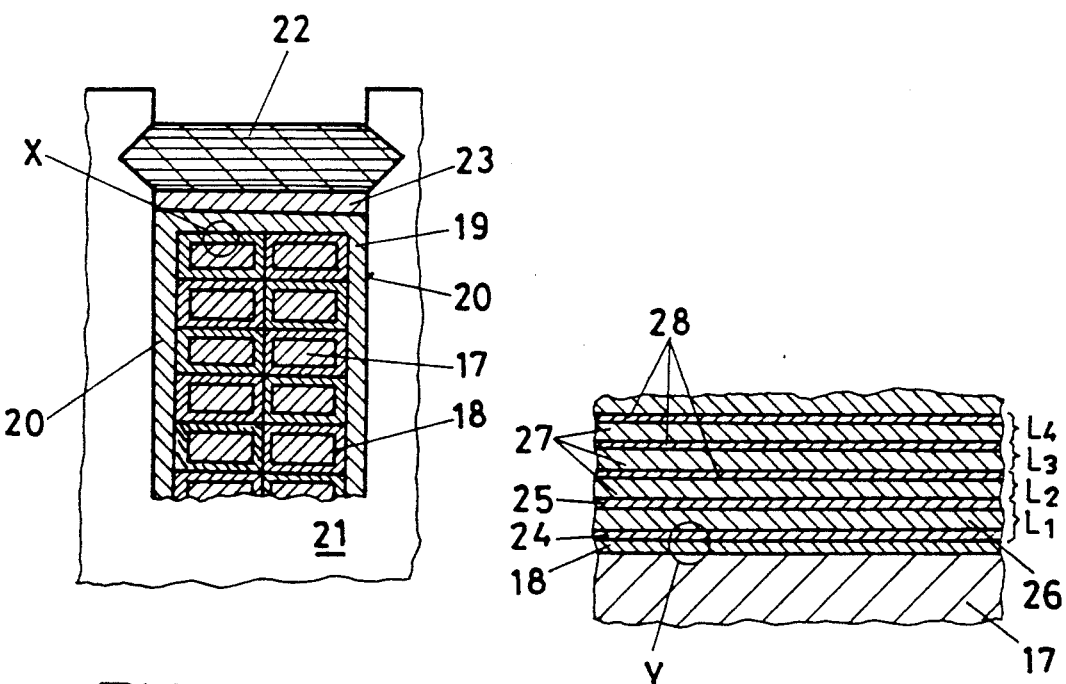
FIG.2
FIG.3
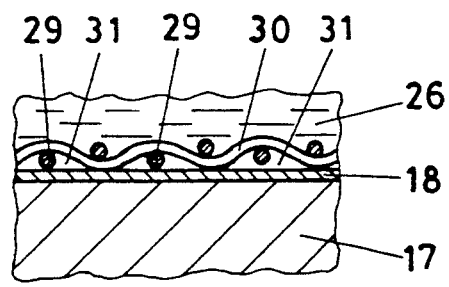
FIG.4

HIGH-VOLTAGE INSULATION FOR STATOR WINDINGS OF ELECTRIC MACHINES

BACKGROUND OF THE INVENTION

1. Field of the Invention

The invention relates to a high-voltage insulation for stator windings of electric machines, comprising a component conductor insulation and a major insulation, in which the component conductors are combined to form bars and surrounded by a major insulation which is impregnated with impregnating resin, the major insulation having multilayer strips which contain mica and carrier material and are wound around the bars in a plurality of layers.

2. Discussion of Background

The electrical and mechanical characteristics of the major insulation are decisive in the insulation of the stator winding conductors of electric machines against the grounded laminate stack. In the case of nominal voltages, of a few 100 V up to 30,000 V, the thickness of the major insulation varies in the range from 0.5 to 8 mm in conjunction with a stress of approximately 2 kV/mm. Added to this are the high demands on the insulation, which result from the thermal stress and, in the case of long machines, from thermomechanical expansion forces in the longitudinal direction of the slot. It is therefore necessary for the slot insulation to be applied in a fashion as free from air as possible and firmly joined to the conductor.

In recent years, the production of continuous winding insulations has to a great extent seen the introduction of vacuum impregnation using curable, solvent-free resins in the case of power windings. It permits the use of fine-mica or laminated-mica strips of the most varied type, which can firstly be wound onto the bars in a virtually dry form using a low proportion of binder. For this purpose, mica strips between 20 and 40 mm wide are applied by hand or machine in thicknesses of 0.1 to 0.3 mm overlapping in a precisely prescribed number of layers. Laminated-mica strips are generally processed using two support layers. Layers made from paper, polyester nonwoven or glass fabric are customary. Fine-mica strips can also be used with one support layer (cf. H. Sequenz "Herstellung der Wicklungen elektrischer Maschinen" ["Production of the Windings of Electric Machines"], Springer Verlag, Vienna—N.Y., 1973, pages 147 ff.).

Basically for reasons of mechanical strength, mica strips which have a single support layer are wound on in such a way that the mica layer is directed against the conductor. Because of the structure of the mica material, the adhesion of the innermost layer is not very permanent. Given the mechanical and thermal stresses which occur during operation, detachment phenomena occur which reduce the dielectric strength of the major insulation.

The total proportion of mica in the major insulation is reduced if use is made of mica strips covered all along on both sides by supports.

SUMMARY OF THE INVENTION

Accordingly, one object of this invention is to provide, starting from the prior art, a novel high-voltage insulation for bar windings of electric machines which has as high as possible a proportion of mica and simultaneously adheres effectively to the conductors, and facilitates the penetration of the impregnating resin into the insulation serving.

The object is achieved according to the invention when only the first layer of the major insulation consists of a three-layer mica strip having textile carriers on both sides, which first layer is adjoined by a plurality of layers of mica strip having a single textile carrier, the mica layer being directed against the conductor in the case of these layers.

The insulation/conductor bonding is substantially improved in this way during later impregnation of the main insulation, because there are present in or on the textile carrier between the mica layer and conductor surface longitudinal and transverse channels which act as an impregnation aid and which effect an optimum wetting with impregnant, and in addition the textile carrier bonds reliably to the conductor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which represent a diagrammatic representation of an exemplary embodiment and wherein:

FIG. 1 shows the top view of a stator winding, constructed from Roebel bars, of an electric machine;

FIG. 2 shows a cross section through a stator slot with inserted bar;

FIG. 3 shows an enlarged representation of the detail X from FIG. 2; and

FIG. 4 shows an enlarged representation of the detail Y from FIG. 3.

DESCRIPTION OF THE PREFERRED EMBODIMENTS

Referring now to the drawings, wherein like reference numerals designate identical or corresponding parts throughout the several views, a stator bar of an electric machine in accordance with FIG. 1 has a straight coil section 11 in the slot region and bent sections 12 and 13 in the winding overhang region. The bar is provided with an insulation which is designated in general by the reference numeral 14 and is the subject matter of the present invention.

As emerges from the cross section in accordance with FIG. 2, the bar is constructed from a multiplicity of mutually insulated component conductors 17 which are twisted in accordance with the Roebel principle. Each component conductor has a component conductor insulation 18 of known design. The component conductors are combined to form a conductor bundle and surrounded by a common insulating sleeve, the major or main insulation 19, and are situated in a stator slot 20 in the laminate stack 21 of the machine. The rods are fixed by means of slot wedges 22 and wedge supports 23.

The structure of the major insulation 19 follows from FIG. 3, which shows an enlargement (not to scale) of the detail X from FIG. 2. The major or main insulation 19 consists of a multiplicity of mutually overlapping layers $L_1$, $L_2$, $L_3$, $L_4$ . . . of mica strips. The innermost layer L1 comprises in this case a mica layer 26 which is covered on both sides by textile carriers 24, 25, preferably glass fiber fabric. In this case, a "textile carrier" is understood to be a strip consisting of fibers or threads which by contrast with a foil is transparent to impregnating resin in, across and perpendicular to the strip direction. By contrast, the layers $L_2$, $L_3$, $L_4$ ... adjoining it consist in each case of one mica layer 27 which has only a single textile carrier 28. The mica strip forming the layers $L_2$, $L_3$, $L_4$ ... is applied in this case in such a way that the mica layer 27 points in each case to the copper conductor 17.

It can easily be seen in FIG. 4, which represents an enlargement of the detail Y from FIG. 3, that channels 31 which extend between the warp threads 29 and weft threads 30 of the textile carrier 24 in the bar longitudinal direction are produced between the mica layer 26 and the component conductor surface 18. It is possible during the later impregnation of the major insulation for the impregnating resin to pass through these channels to virtually all points of the conductor surface, to wet the latter reliably and in a short time, and to ensure optimum bonding of the major insulation to the conductor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A high-voltage insulation for stator windings of electric machines in which the stator windings include a plurality of component conductors combined into a rod, and wherein each of said component conductors include component conductor insulation such that a plurality of component conductors each having component conductor insulation form said rod, and further wherein a main insulation is provided about said rod formed of said component conductors and component conductor insulation, said main insulation comprising:

a plurality of strips wound about said rod in multiple layers, each of said strips including a layer of mica, and further wherein said plurality of strips include a first kind of strip and a second kind of strip;

said first kind of strip including a three layer structure having a central mica layer disposed between a pair of textile carrier layers which cover the mica layer;

said second kind of strip including a two layer structure including a mica layer having only one side thereof provided with a textile carrier covering only said one side of said mica layer; and wherein said second kind of strip is disposed in said main insulation such that said one side of said mica layer is directed away from said component conductors, while another side of said mica layer of said second kind of strip which does not include a textile carrier faces toward said component conductors.

2. The high-voltage insulation of claim 1, wherein a plurality of said second kind of strips are provided, and wherein a single one of said first kind of strip is provided, and wherein said first kind of strip is disposed interiorly of said plurality of said second kind of strips.

3. The high-voltage insulation as claimed in claim 1, wherein the textile carriers consist of glass fabric.

* * * * *